Aug. 6, 1957 R. C. RICHARDSON 2,801,471
MACHINE FOR MEASURING AND CUTTING FLOOR COVERING
Filed May 10, 1954 3 Sheets-Sheet 2

INVENTOR
Richard C. Richardson
Ralph Burch
Attorney

Aug. 6, 1957 R. C. RICHARDSON 2,801,471
MACHINE FOR MEASURING AND CUTTING FLOOR COVERING
Filed May 10, 1954 3 Sheets-Sheet 3

INVENTOR
Richard C. Richardson
Ralph Burch
Attorney

United States Patent Office 2,801,471
Patented Aug. 6, 1957

2,801,471

MACHINE FOR MEASURING AND CUTTING FLOOR COVERING

Richard C. Richardson, Newcastle Bridge, New Brunswick, Canada, assignor of one-half to Angelo Joseph Di Carlo, Minto, New Brunswick, Canada Application May 10, 1954, Serial No. 428,475

5 Claims. (Cl. 33—135)

This invention relates to measuring and cutting devices and, more particularly, to means for accurately measuring and cutting rolled materials.

It is common in present day commerce to supply certain materials, e. g.—floor coverings, in rolls and to sell these materials in lengths specified by the customer. It is usual to employ a yardstick for measuring these specified lengths and to simply snip off the material in more or less haphazard fashion usually to the detriment of the customer. A further disadvantage of this method of dispensing such materials is the ragged and uneven edge resulting from the use of common shears.

I have found that these disadvantages may be overcome by the provision of a roll goods measuring and cutting rack consisting of a simple frame, means for mounting the roll of material on the frame, and novel and accurate cutting means mounted on the said frame. Measuring means also are provided as are means for binding the material cut from the said roll.

One object of the invention, therefore, is the provision of means for easily and accurately cutting roll materials to specified lengths.

A further object of the invention is the provision of simple means for measuring these specified lengths of material.

Yet another object of the invention is the provision of a stowage and display rack for rolled goods, and a means mounted on the said rack for easily and accurately measuring, cutting and binding specified lengths cut from the said roll goods.

With these and other objects in view which may appear while the description proceeds the invention consists in the novel arrangement of co-operating parts shown in the accompanying drawings forming part of this application and in which.

Figure 1:
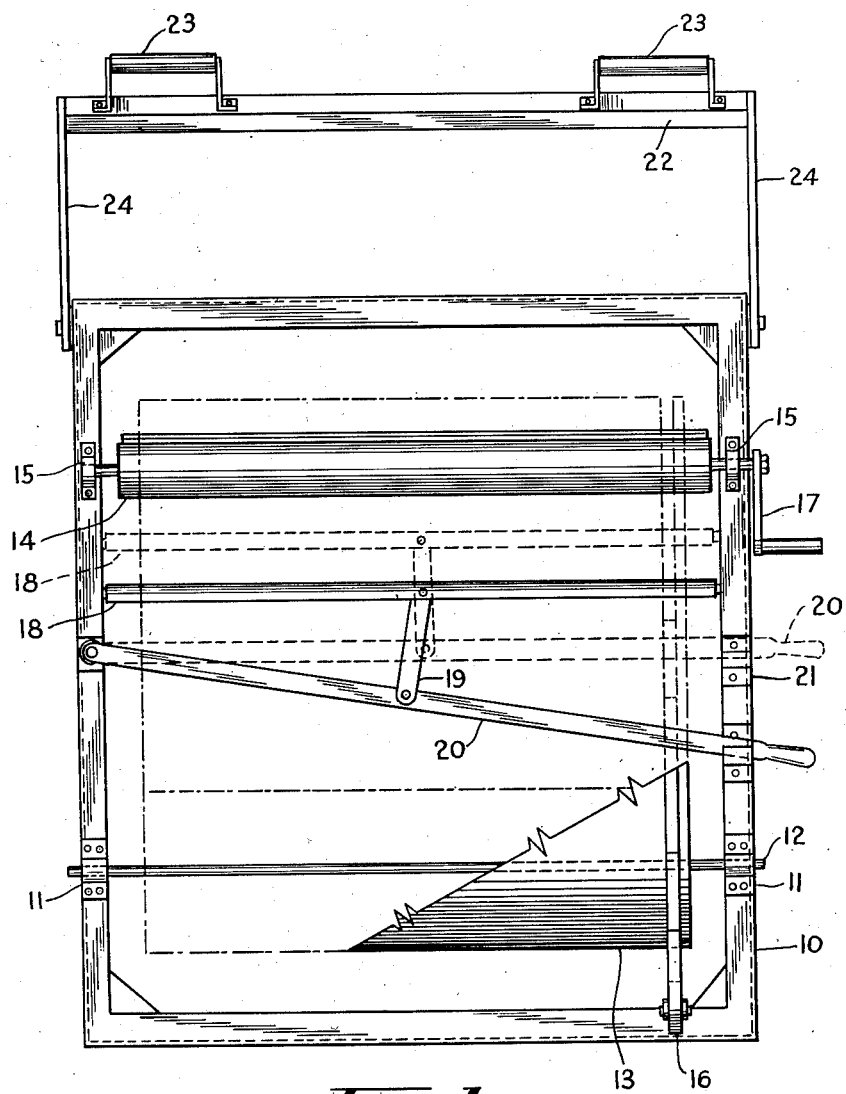
Figure 1 is a front elevation of one embodiment of the invention partially showing a roll of material mounted near the base of a rack or frame, and showing a take-up roller near the top of the said frame and means for parting off specified lengths of the said material.
Figures 2, 3:
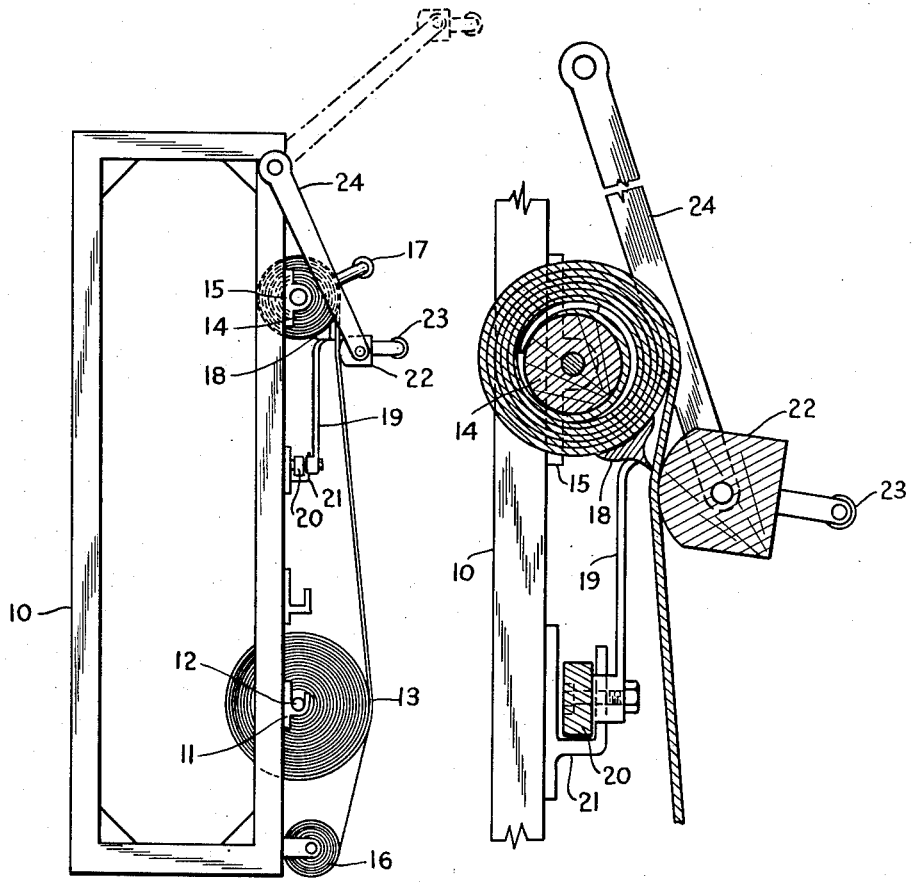
Figure 2 is a partly diagrammatic side view of this embodiment.
Figure 3 is an enlarged side view of a means for cutting the roll material.

In the drawings, wherein for the purpose of illustrating the invention like reference characters will be employed to designate like parts throughout, the reference character 10 designates a frame which may be of any suitable material and cross section. A roller or rod 12 is removably secured in brackets or hangers 11, which are mounted on opposite edges of the frame and near the base thereof, whereby a roll of material 13 to be cut, may be removably disposed on the said frame for unrolling. A roller 14 is revolubly detachably mounted in hangers 15 which are mounted upwardly on opposite sides of the frame 10, and is provided with suitable means for securing thereto, the outer end of the said roll of material. A terminal crank 17 is secured to the roller 14 so that the latter may be rotated to withdraw a portion of material from the said roll of material 13.

Revolubly detachably secured near the base of the frame 10 is a roll of paper or other suitable material 16 which may be graduated in yards or other suitable units and which may be payed out simultaneously with the said portion to be cut from the said roll of material thereby providing a visual, accurate and continuous measure of the material rolled on the roller 14.

Means for cutting the material from the roll 13 are provided, and, as shown, consists partly of a knife 18 of novel section which is adapted so as to be placed against the material wound on the roller 14. The said knife is pivotally attached through a link 19 to a lever 20 which in turn is pivotally secured to one edge of the frame 10 and is movable upwardly or downwardly therealong, thereby permitting the said knife to be placed in intimate contact with the material on the roller 14; a bracket 21 being suitably positioned on the said frame for locking the lever in an upward position. The remaining portion of the cutting means comprises a swingingly mounted bar 22. The bar 22 is fitted with suitable handles 23 and is swingingly mounted to the upper portion of the frame 10 by suitable linkages 24 so that it may manually be pulled down sharply to force the roll material against the knife 18.

Figure 4:
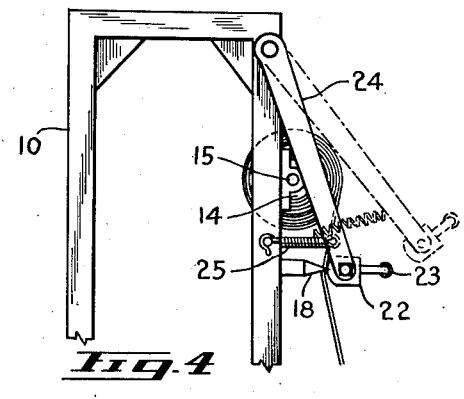
Figure 4 is a partial view of a modified form of cutting means.

In the modification shown in Figure 4, of the drawings, a knife is mounted transversely to the frame 10, and expansible elastic means, e. g.—coil springs 25, are connected between the bar 22 and the frame 10.

Figure 5:
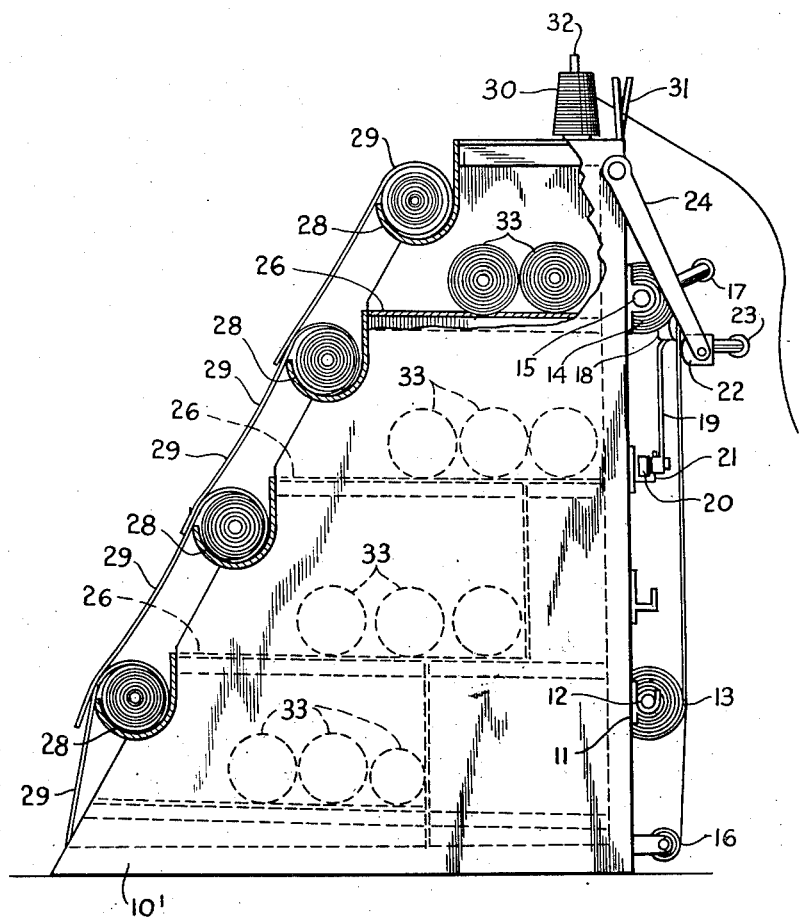
Figure 5 is another embodiment having stowage and display means for roll materials.

In the embodiment shown in Fig. 5, of the drawings, a frame 10' of greater depth is provided in order to provide a convenient stowage and display rack for various rolls of material 29 and 33. The said frame 10' is provided with a plurality of rearwardly extending shelves 26 having rearwardly disposed terminal troughs 28 in which the said various rolls of material may be placed for display. Mounted atop the frame 10' is a spindle 32 for a spool of suitable binding material 30. Also mounted on the frame 10' is a knife or cutter for cutting the said binding material. In this modification the roll material measuring and cutting means are substantially as hereinbefore described and require no further description.

In normal operation the material 13 is placed on the bar 12 which is then placed in the hangers 11 near the base of the frame 10 or 10'. The end of the material is secured to the roller 14 as is the end of the graduated tape 16 and both are simultaneously wound on the roller 14 until the desired length has been withdrawn from the roll of material 13. The knife 18 is now brought into intimate contact with the material wound on the roller 14, by means of the lever 20 which is placed in the securing bracket 21. The bar 22 is then brought down sharply compressing the material 13 against the knife 18 thereby cutting both the tape 16 and material 13 to the measured length. The cut-off material is then bound in usual fashion with the binding material 30, whereupon the roller 14 may be removed from the frame 10 and the bound material removed therefrom.

It is evident that a similar action occurs with the modified cutting means shown in Fig. 4, of the drawings. In this instance the coil springs 25 are tensed by swinging the bar 22 away from the frame 10 whereupon the said bar is released to effect the required cutting operation.

It is believed that the construction and advantages of the structure shown may be apparent from the foregoing paragraphs taken in conjunction with the accompanying drawings without further detailed description.

While the preferred embodiment of the invention has been disclosed it is understood that minor changes in the construction, combination and arrangement of cooperating parts may be resorted to within the scope of what is claimed without departing from the spirit of the invention.

I claim:

1. In a device of the character described, a structure comprising a frame, an elongated member detachably mounted on the said frame for revolubly supporting a roll of material, a roller detachably mounted near the top of the said frame, said roller being adapted to have said material wound thereon, means for rotating the said roller, a roll of expendable calibrated tape revolubly mounted on the said frame, the free end of the said tape being secured to the free end of the said material, a lever pivotally mounted on the said frame and disposed rearwardly of the material to be cut, a pivoted link extending upwardly from the said lever, a knife pivotally secured to the said link, the base of the said knife being disposable longitudinally to the said roller and in intimate contact with the material wound thereon, means for securing the said knife in intimate contact with the said material, and a bar swingingly mounted on the said frame and manually operable to force the said material against the said knife thereby cutting off a specified length.

2. In a device of the character described a structure comprising a frame, an elongated member detachably mounted on the said frame for revolubly supporting a roll of material, a roller detachably mounted near the top of the said frame, said roller being adapted to have said material wound thereon, means for rotating the said roller, a roll of expendable calibrated tape revolubly mounted on the said frame, the free end of the said tape being secured to the free end of the said material, a lever pivotally mounted on the said frame and disposed rearwardly of the material to be cut, a pivoted link extending upwardly from the said lever, a knife pivotally secured to the said link, the base of the said knife being disposable longitudinally to the said roller and in intimate contact with the material wound thereon, means for securing the said knife in intimate contact with the said material, a bar swingingly mounted on the said frame and tensed expansible elastic members connecting the said bar to the said frame and operable on untensing to force the said bar to press the material against said knife thereby cutting the material.

3. A device of the character described comprising an upright frame, a transverse shaft at the lower end of said frame for revolubly supporting a roll of sheet material, a transverse roller revolubly mounted above said shaft on which said material is adapted to be wound, a transverse cutter bar intermediate said shaft and roller, means for moving said cutter bar towards and from said roller, said cutter bar having an outwardly projecting cutting edge in close proximity to the rear face of said material, and a transverse pressure bar pivotally mounted on said frame for swinging movement towards said cutter in front of said material for pressing the material against said cutting edge to sever the material.

4. A device as described in claim 3 including spring means normally tensioning said pressure bar to swing towards said cutter bar.

5. A device of the character described comprising an upright frame, means for revolubly supporting a roll of material transversely of the lower end of said frame, a roller revolubly mounted transversely of the upper end of said frame on which the material is adapted to be wound, means for rotating said roller, a lever extending transversely of said frame intermediate the roll of material and said roller, means pivotally connecting one end of said lever to said frame for vertical pivotal movement, an elongated cutter bar extending transversely of said frame rearwardly of said material, a link pivotally connected to said cutter bar intermediate its length having its opposite end pivotally connected to said lever whereby said cutter bar is moved upwardly into contact with the material wound on said roller upon upward movement of said lever, said cutter bar having an outwardly projecting cutting edge, and a transverse pressure bar pivotally mounted on the upper end of said frame for downward swinging movement toward said cutter bar adapted to press the material against the cutting edge of said cutter bar to sever the material.

References Cited in the file of this patent

UNITED STATES PATENTS

| | | |
|---|---|---|
| 244,253 | Judd | July 12, 1881 |
| 744,637 | Soennecken | Nov. 17, 1903 |
| 1,234,926 | Mueller | July 31, 1915 |
| 1,191,777 | Fishering | July 18, 1916 |
| 1,337,260 | Pauk | Apr. 20, 1920 |
| 1,338,248 | Nelson | Apr. 27, 1920 |
| 1,352,240 | Baldwin | Sept. 7, 1920 |
| 2,252,086 | McCarthy | Aug. 12, 1941 |